United States Patent [19]

Meyer

[11] Patent Number: 4,723,065
[45] Date of Patent: Feb. 2, 1988

[54] ELECTRIC AUTOMOTIVE FUEL HEATING SYSTEM

[75] Inventor: Howard E. Meyer, 110 Parklane Dr., Slippery Rock, Pa. 16057

[73] Assignees: Howard E. Meyer, Slippery Rock; Donald D. Munroe, Pittsburg, both of Pa.

[21] Appl. No.: 755,214

[22] Filed: Jul. 15, 1985

Related U.S. Application Data

[63] Continuation of Ser. No. 591,044, Mar. 19, 1984, abandoned.

[51] Int. Cl.[4] .......... H05B 1/02; H05B 3/82; F24H 1/10; F02M 31/00
[52] U.S. Cl. .................. 219/205; 123/549; 123/557; 165/184; 165/185; 219/298; 219/305; 219/306; 219/308; 219/330; 219/374; 219/530; 431/208
[58] Field of Search .............. 219/296–299, 219/301–306, 308, 309, 205–207, 330, 381–382, 374, 365, 530, 540; 165/184, 185; 123/549, 557; 431/208

[56] References Cited

U.S. PATENT DOCUMENTS

| 822,372 | 6/1906 | Kitchen et al. | 165/184 |
|---|---|---|---|
| 1,350,871 | 8/1920 | Lamont | 123/557 |
| 1,549,016 | 8/1925 | McLean | 219/306 X |
| 1,688,796 | 10/1928 | Baker | 219/305 X |
| 1,809,077 | 6/1931 | Shuman | 219/306 X |
| 2,355,693 | 8/1944 | Aldrich | 123/557 |
| 2,686,863 | 8/1954 | Chandler | 219/306 X |
| 2,775,683 | 12/1956 | Kleist | 219/305 X |
| 2,825,791 | 3/1958 | Jackson | 219/306 X |
| 3,498,279 | 3/1970 | Seeley | 123/557 X |
| 4,259,937 | 4/1981 | Elliott | 165/154 X |

FOREIGN PATENT DOCUMENTS

| 213423 | 7/1960 | Austria | 165/184 |
|---|---|---|---|
| 259740 | 1/1968 | Austria | 219/305 |
| 579942 | 7/1959 | Canada | 219/306 |
| 2440426 | 3/1976 | Fed. Rep. of Germany | 219/305 |
| 549860 | 10/1956 | Italy | 219/306 |
| 48-301 | 1/1983 | Japan | 219/306 |
| 585981 | 3/1947 | United Kingdom | 165/184 |
| 858875 | 1/1961 | United Kingdom | 219/305 |
| 885164 | 12/1961 | United Kingdom | 165/184 |
| 930991 | 7/1963 | United Kingdom | 165/184 |
| 1095018 | 12/1967 | United Kingdom | 219/306 |
| 1454772 | 11/1976 | United Kingdom | 219/306 |
| 2078298 | 1/1982 | United Kingdom | 219/305 |

*Primary Examiner*—Anthony Bartis
*Attorney, Agent, or Firm*—Carothers and Carothers

[57] ABSTRACT

A fuel preheating system for an internal combustion engine wherein a preheater includes a body member having defined therein a pair of serially connected, generally parallel bores defining a flow passages through which a flow of fuel may be passed for heating thereof by elongated electric heaters extending within the passages and including a heating element encompassed by helical coils of a heat exchange structure. At least some of the coils of the heat exchange structure define plural tortuous flow paths extending generally axially of the heater. The heat exchange structure has some coils with portions which are maintained in engagement with the heater and other portions which are maintained in thermal conducting and supporting engagement with peripheral wall portions of the flow passage such that a temperature control device carried on an exterior surface portion of the body member operatively interacts with the heaters to control the supplying of energy thereto for heating the fuel passing through the preheater in response to the temperature of the body member.

13 Claims, 5 Drawing Figures

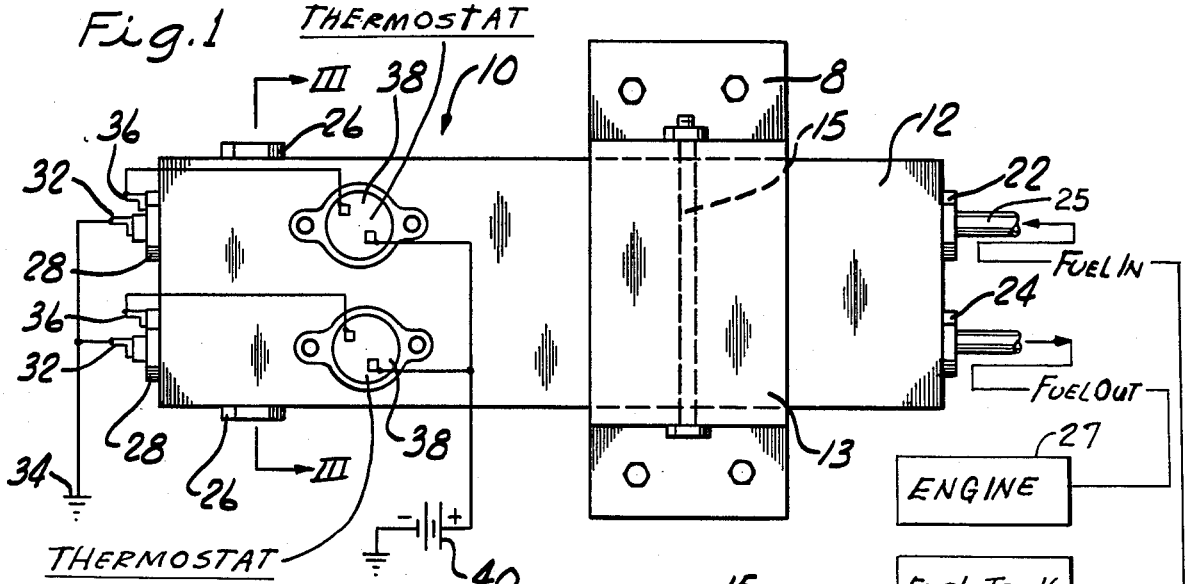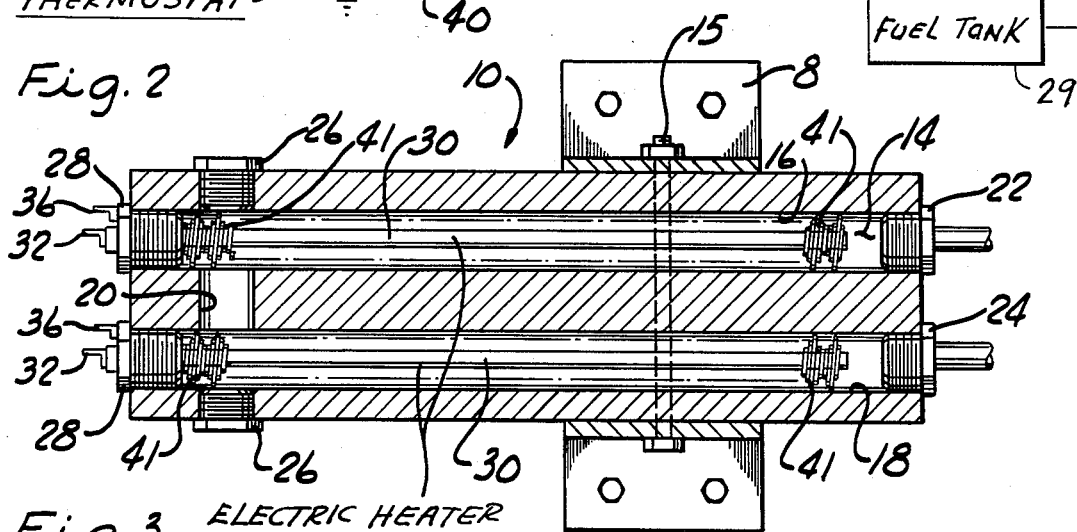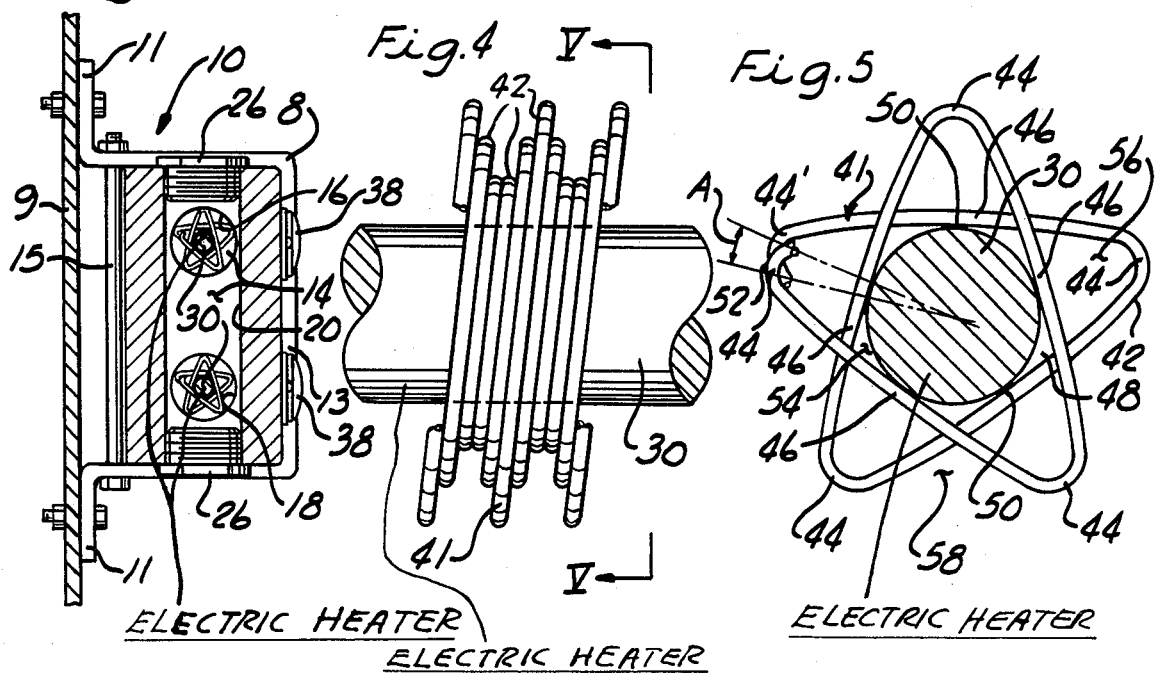

ELECTRIC AUTOMOTIVE FUEL HEATING SYSTEM

This application is a continuation of application Ser. No. 591,044, filed Mar. 19, 1984, now abandoned.

In the automotive arts it is well known to provide certain types of internal combustion engines, diesel engines for example, with fuel preheaters to elevate the fuel temperature, to prevent wax formation and clogging of the fuel filters, all prior to injection of the fuel into the engine cylinders. Such preheaters have often been electrical resistance heaters, for example, and proper operation of diesel engines has often been impossible without the use of such fuel preheaters.

Also well known are engine block warmers for warming an internal combustion engine block prior to engine startup. Such block warmers have also often been electric resistance heaters which heat the engine coolant so that spontaneous thermal currents slowly circulate the warm coolant through the engine block. Diesel engines in particular require engine block warming in cold operating environments to facilitate startup from a cold condition.

In many prior electric resistance type fuel preheaters and engine block warmers an electric resistance heating element directly contacts the flow of fuel or coolant as it passes through the heating unit. In the case of fuel preheaters specifically, direct contact of the heating element with fuel can result in overheating of the fuel or non-uniform heating of the fuel flow. Overheating of the fuel may result in a tendency for the fuel to carbonize within the flow path thus producing particles which can flow with the fuel stream and clog the fuel filter. Fuel which carbonizes on the heating element will form a thermal insulation barrier which reduces heat input to the fuel from the heating element, increases the temperature gradient from the heating element to the fuel for a given energy transfer rate, and may result in heating element burnout.

Prior art fuel and coolant preheaters also have often been unnecessarily costly. Not only have materials and fabrication methods been uneconomical, but in addition procured subassemblies and components have been of higher than necessary cost. This has been due in large part to perceived design limitations for prior preneaters and resulting restrictions on the range of suitable design parameters for the various component parts. For example, standard electric resistance heating elements which one might incorporate into a fuel preheater design are available in a wide range of wattage ratings and watt densities. A high watt density heater would be preferable in many fuel preheater designs to promote fast initial warmup and to permit the preheater to be of relatively of compact proportions. However, higher watt density heaters also tend to overheat the fuel which directly contacts the heating element and may promote deleterious fuel carbonizing. Thus, the higher watt density heating elements although desirable, have not been acceptable in many instances.

SUMMARY OF THE INVENTION

The present invention provides for an improved and simplified fuel preheater which overcomes the above and other disadvantages of the prior art. Specifically, the invention offers an improved and simplified fuel preheater structure which may be utilized in any of a variety of preheater designs including single and multiple heat source designs, and furthermore in multiple heat source designs wherein one of the heat sources for fuel preheating may be coolant flow from the engine block.

The invention also contemplates an improved structure for heat exchange between relatively hotter and cooler heat exchange media for use in a variety of heat exchange applications to effect heat transfer to or from a fluid medium. Although not limited thereto, the improved heat exchange structure of this invention is well suited for use in a fuel preheater to alleviate the above-mentioned problems of prior fuel preheaters.

More specifically, the invention in one preferred form which is described in general detail hereinbelow, contemplates a unitary preheater body member having open-ended bores therein, and respective ones of which receive plugs, conduit connectors or electric resistance heating elements to provide the improved and simplified fuel preheater. The electric resistance heating elements are elongated in form, extending axially of the respective bores in which they reside, and each such heating element is encompassed by an axially-extending heat exchange structure of coiled wire. The heat exchange structure serves to direct fuel flow within the respective bore for maximum heat exchange and turbulence and also may provide support for the heating element by being maintained in supporting engagement with the interior walls of the bore.

It is therefore one object of the invention to provide a new and improved fuel preheater for an internal combustion engine.

Another object of the invention is to provide an improved heating element for a fuel preheater.

Another object of the invention is to provide an improved heat exchange structure for thermal energy transfer to or from a fluid medium.

Another object of the invention is to provide such an improved heat exchange structure for thermal energy transfer to or from a flowing fluid medium.

Other objects and advantages appear in the following description and claims.

The accompanying drawings show, for the purpose of exemplification without limiting the invention or the claims thereto, certain practical embodiments illustrating the principles of this invention wherein:

FIG. 1 is a side elevation of a fuel preheater of the instant invention;

FIG. 2 is a sectioned side elevation of the preheaters of FIG. 1;

FIG. 3 is a section taken on Line III—III of FIG. 1;

FIG. 4 is a fragmentary side elevation of the heat exchange structure of this invention; and FIG. 5 is an end elevation taken on line V—V of FIG. 4.

There is generally indicated at 10 in FIGS. 1, 2 and 3 a fuel preheater according to one presently preferred embodiment of the instant invention and comprising a generally elongated body member 12 which is secured as by a bracket-clamp assembly 8 bolted to a suitable surface such as a firewall 9 of a vehicle (not shown). Bracket clamp assembly 8 includes mounting flanges 11 (FIG. 3) and a formed portion 13 which surrounds three sides of body 12. A clamping bolt assembly 15 extends through formed portion 13 and across the remaining side of body 12. Clamping bolt assembly 15 may be selectively tightened down to clamp the preheater body 12 therein at any of a plurality of positions with respect to claim 8. That is, body 12 is longitudinal slideable within clamp 8 to a desired position prior to securing thereof by bolt 15. Body member 12 has fuel flow channels 14 formed therein for carrying a flow of fuel in heat exchange relationship with a source of thermal energy. The body 12 preferably may be a solid extrusion, of aluminum for example, which can be thin walled and light weight (unlike those of the prior art which required a large mass for heat transfer), within which the flow channels 14 are formed as a pair of generally parallel, longitudinally extending through bores 16, 18, and a transversely extending through bore 20 which intersects bores 16, 18 adjacent one longitudinal end of body 12.

At one longitudinal end of body 12, the bores 16, 18 have threadedly and sealingly engaged therein in a respective fluid flow connection 22, 24 for connection in series with the fuel line 25 of an internal combustion engine 27. Accordingly, in practice fuel may flow from a tank 29 to such an internal combustion engine 27 by passing via line 25 and connection 22 into preheater 10 and thence via bores 16, 20 and 18 in sequence to connection 24.

To provide a closed flow path within body 12 between connections 22 and 24, the opposite open ends of bore 20 are closed by plugs 26 threadedly and sealingly engaged therein. Similarly, the ends of each bore 16, 18 opposite the respective connection 22, 24 is sealed by threaded engagement therein of the mounting stud 28 of an elongated electric resistance heating element 30 which extends within the respective bores 16, 18. The flow channel 24 thus is generally U-shaped in form with bores 16, 18 forming the legs of the U.

To provide power to heating elements 30 for heating of fuel flow, any suitable circuitry may be provided; for example, various elements of the circuitry described in the inventor's copending application Ser. No. 576,568 filed Feb. 3, 1984, would be suitable. The entire specification of the cited application Ser. No. 576,568 is incorporated herein and made a part hereof by reference. A simplified and purely illustrative circuitry scheme is shown in FIG. 1 as having one terminal 32 of each heating element 30 connected to the vehicle ground 34. The other terminal 36 of each heating element 30 is series connected through a respective surface mounted thermostat 38 to a power source such as the vehicle battery 40.

The thermostats 38 may be of a suitable rating and temperature setpoint to conduct power for energizing heating elements 30 when the fuel flow within flow channels 14 is below a desired preheat temperature. For example, thermostats 38 may have a temperature setpoint of 80° F. and a rating sufficient to control power supply to a 350 watt heating element from a 12 volt power source. By way of further example, the same thermostat could be utilized with a 700 watt heating element in a 24 volt electrical system.

In the embodiment shown, fuel flow is heated by the independently operable and independently controlled heating elements 30 to provide for uniform preheat of the fuel contemplated alternative embodiments of the improved fuel preheater include:

1. A body member similar to body 12 but having a single longitudinal through bore with a heating element extending therewithin from one end of the bore. A connecting lateral bore and the opposite end of the longitudinal bore serve as inlet/outlet connections for fuel flow through the heater, and a surface or stud mounted thermostat on the body member controls operation of the heating element.

2. A body member such as described above with reference to the preferred embodiment or the first mentioned alternative embodiment, additionally including a bored cavity with inlet and outlet connections for engine coolant flow whereby heated engine coolant may be utilized for fuel preheating.

3. A fuel preheater such as that of the second mentioned alternative embodiment additionally including a heating element, thermostatic control, and control circuitry for heating engine coolant in the described bored cavity to provide engine block warming during periods of extended shutdown.

Any of the above described embodiments may be carried out by use of a body member formed by boring out suitable networks of flow passages in a solid metal block, such as an aluminum extrusion.

Each of the above described heating elements 30 is provided with a heat exchange structure 41 in the form of a one or more elongated runs of copper clad steel or stainless steel wire which encompass the respective heating element 30 in successive turns 42. On reference to FIGS. 4 and 5, the wire structure 41 preferably is one or more lengths of wire each formed in a plurality of turns 42 and with each turn 42 about heating element 30 being formed by a plurality of uniform angular bends 44 spaced at intervals along the wire. Each bend 44 preferably forms an acute angle which opens radially inward toward the heating element 30. Thus, generally straight portion 46 of the wire extends between each adjacent pair of bends 44. Viewed axially as in FIG. 5, the straight portions 46 define an elongated axially extending opening 48 within which the heating element 30 resides. Midway of the length of each wire portion 46, the structure 41 supportingly contacts heating element 30 as at 50 for example. Thus, the heating element 30 is preferably circular in cross section to facilitate such supporting contact.

In order to assure positive contact at 50, the wire turns 42 may be formed such that the limiting transverse dimensions of opening 48 are incrementally smaller than the diameter of heating element 30. Thus, upon insertion of the heating element 30 into opening 48, the portions 45 are sprung slightly outward as depicted in FIG. 5 to provide a positive, spring biased engagement at points 50.

The successive turns 42 preferably are not based on an exact multiple of 360 degrees. Therefore, a spiral effect is achieved in the structure 41. For example, in FIG. 5, beginning at 52, there are five of the bends or angles 44 before a sixth bend 44' occurs again proximate the circumferential position 52; however, bend 44' will be offset circumferentially from the position 52 by an angle A. In the FIG. 5 embodiment, each bend 44 will be similarly offset circumferentially from the sixth previous bend 44 and from the sixth subsequent bend 44 such that a line connecting the respective apexes of every sixth bend 44 will form a spiral about the axis of heating element 30.

The possible geometric variations on the wire structure 42 are numerous. The gauge of the wire may be chosen from a range of sizes. Limiting factors generally are that the wire gauge should be as large as possible to maximize the surface area available for thermal energy exchange without unduly restricting the fuel flow axially through the flow channels 14. The specific geometry of the wire turns 42 may be varied widely. The configuration of FIG. 5 is substantially a five point star although numerous other configurations having more or fewer points or apexes are contemplated. Furthermore, the angle of circumferential offset A may be varied to produce larger or smaller pitch for the above described spiral aspect of the wire structure 41. In addition, the bends 44 may be quite sharp or more gently rounded. The outer surface portion of each bend 44 preferably will contact the walls of the flow channel 14 within which the heating element is disposed. Thus, a more gently rounded bend 44 per turn will result in more heat transmission into the walls of the bore; however this will also tend to direct fluid flow away from the periphery of the bore and radially inward toward the heating element 30.

While the wire structure 41 shown in FIG. 4 is illustrated as a closed coiled structure in that adjacent turns thereof engage each other, it is preferred that adjacent coils do not engage each other in order to expose more or maximum surface area of the wire structure for maximum heat exchange and turbulance of fluid flow over the wire structure. The spacing between adjacent turns of wire structure 41 can be varied upon the application to which the heat exchange apparatus is to be applied and the fluid medium being employed. This spacing can be adjusted by selecting the pitch ratio of the wire structure 41. The pitch ratio shown in FIG. 4 can be described as a 1 to 1 ratio whereas a ratio of up to 1 to 10 might typically be selected.

The wire structure 41 defines generally axial flow passages within opening 48 in the clearances 54 between the heating element 30 and the structure 41. Similarly, axial flow passages are defined as at 56 and 58 by the geometry of the wire structure 41. Since the passages 54, 56 and 58 all are defined by the pattern formed by the successive turns 42 of structure 41, the structure tends to only partially direct flow axially through the described passages. The structure 41 also tends to disrupt and partially obstruct the flow thereby creating turbulence. The above described spiral effect also contributes to the creation of turbulent flow. The turbulence promotes more efficient and uniform heat exchange between the heating element 30 and the fuel flowing thereover.

The wire structure 41 not only contributes to efficient heat exchange by creating turbulent flow; it also greatly increases the heat exchange surface area of the heating element 30. Thermal energy from heating element 30 heats wire structure 41 via contact points 50. Thus, the fuel flowing in turbulent fashion over the wire structure 41 and through openings 54, 56 and 58, as well as along the surface of heating element 30, is efficiently heated. In order to assure good contact for thermal energy transfer, the points 50 may be soldered because the heat exchange surface area is greatly increased by the use of wire structure 41, on the order of 1½ to 4 times the surface area of heating element 30 alone, a much higher than usual watt density heating element may be used thus permitting more fuel preheating capacity in a smaller heater unit, and quicker warmup of the unit prior to initiation of fuel preheating. The improved efficiency of heat transfer induced by the turbulent, spiral flow of fuel about the heating element 30 is also a significant factor in providing conditions favorable for use of a higher than usual watt density heater.

It will be appreciated that the wire structure 41 may be utilized in a variety of heat exchange applications for transfer of thermal energy to or from a medium flowing in the above-described manner about the exterior of a heating or a cooling element. For example, the electric resistance heating element 30 may alternatively be a conduit withih which a heated fluid flows. Similarly, for use in cooling applications the heating element 30 may be replaced by a conduit which is part of a coolant flow loop such as in the radiator of an automotive engine cooling system or in the evaporation leg of a refrigeration or air conditioning system or as a baseboard heating element wherein the wire structure 41 is exposed directly to the atmosphere.

According to the description hereinabove, there is provided by the instant invention a novel and improved fuel preheater apparatus which includes, among other improvements, a novel structure for heat exchange between the flowing fuel and a source of thermal energy for fuel preheating. As the invention has been described with reference to certain presently preferred embodiments, it is to be appreciated that numerous alternative and modified embodiments are envisioned.

These and other embodiments and modifications having been envisioned and anticipated by the inventor, the invention is to be construed as broadly as permitted by the scope of the claims appended hereto.

I claim:

1. An automotive fuel system for supplying fuel to a motor vehicle engine for combustion thereof in the motor vehicle engine comprising:

a reservoir means for containing a quantity of such fuel;

delivery means communicating intermediate said reservoir means and such an engine for delivery of such fuel to such engine;

said delivery means including a fluid flow conduit means and a flowthrough fuel preheater interposed in line with said conduit means;

said preheater having a body member;

said body member having a flow passage defined therein by a pair of generally parallel open-ended through bores serially connected adjacent one axial end thereof with the pair of adjacent open ends at said one axial end being closed by first plug means and the other pair of open ends thereof being connected to said conduit means to permit a flow of such fuel to be passed through said flow passage;

an elongated heating means extending generally co-axially within said flow passage;

a heat exchanger structure circumferentially encompassing and extending axially of said heating means;

said heat exchange structure including an elongated generally helical coil means comprised of a plurality of axially adjacent coil turns formed about an axis coincident with the axis of said heating means;

at least some of said coil turns including contact portions which are maintained in supporting and thermal conducting engagement with said heating means, and a plurality of support portions which project radially outwardly of said contact portions and are spaced circumferentially about said heating means;

said support portions being maintained in engagement with peripheral wall portions of said flow passage to support said heating means with respect to said body member and to conduct thermal energy from said heating means to said body member;

at least some of said coil turns defining a plurality of tortuous fluid flow paths extending generally axially of said heating means within said flow passage; and temperature control means carried adjacent an exterior surface portion of said body member and operatively connected to said heating means to control the supplying of thermal energy thereby in response to the temperature of said body member sensed adjacent said exterior surface portion by said temperature control means.

2. The fuel system as claimed in claim 1 wherein said heating means includes a pair of elongated electric resistance heating elements disposed, respectively, within said pair of through bores.

3. The fuel system as claimed in claim 2 wherein said temperature control means includes surface mounted thermostat means carried on said exterior surface portion of said body member.

4. The fuel system as claimed in claim 3 additionally including a transverse bore which intersects both said through bores adjacent one axial end thereof to provide said serial connection therebetween.

5. The fuel system as claimed in claim 4 wherein said transverse bore is an open-ended through bore having the open ends thereof sealed by second plug means engaged therein.

6. The fuel system as claimed in claim 5 wherein said thermostat means includes a pair of surface mounted thermostats carried on said exterior surface portion of said body member with each of said thermostats being cooperable with one of said heating elements to control the supplying of energy to the respective said heating element.

7. The fuel system as claimed in claim 6 wherein said coil means is comprised of an elongated helically-formed element having angularly bent, radially-outer portions thereof which provide said support portions and generally elongated portions connecting adjacent ones of said angularly-bent portions to provide said contact portions.

8. The fuel system as claimed in claim 7 wherein said support portions coincide generally with the apexes of the angle formed by said angularly-bent portions.

9. The fuel system as claimed in claim 8 wherein said support portions are maintained in thermally-conducting engagement with said peripheral wall portions.

10. The fuel system as claimed in claim 9 wherein said exterior surface portion is located adjacent said peripheral wall portions.

11. The fuel system as claimed in claim 6 wherein said body member is an aluminum member.

12. In an automotive fuel system for supplying fuel via a conduit means to a motor vehicle engine for combustion thereof, a fuel preheater adapted to be interposed in line with such a conduit comprising:

a body member;

said body member having defined therein a flow passage formed by a pair of generally parallel open-ended through bores serially connected adjacent one axial end thereof with the pair of adjacent open ends at said one axial end being closed by first plug means and the other pair of open ends thereof being adapted for connection in-line with such a conduit to permit a flow of fuel to be passed within said through bores;

elongated heating means extending generally coaxially through said flow passage;

heat exchange means circumferentially encompassing and extending axially of said heating means;

said heat exchange means including an elongated generally helical coil means comprised of a plurality of axially adjacent coil turns formed about an axis coincident with the axis of said heating means, with at least some of said coil turns having angularly bent, radially-outer portions which project radially outwardly of said heating means and are spaced circumferentially about said heating means, and generally elongated portions connecting adjacent ones of said angularly bent portions and which are maintained in supporting and thermal conducting engagement with said heating means;

the apex portions of the angles formed by said angularly bent portions being maintained in thermal conducting and supporting engagement with peripheral wall portions of said flow passage to support said heating means with respect to said body member and to conduct thermal energy from said heating means to said body member;

said at least some of said coil turns defining a plurality of tortuous fluid flow paths extending generally axially of said heating means within said flow passage; and temperature control means carried adjacent an exterior surface portion of said body member and adjacent said peripheral wall portions, and operatively interacting with said heating means to control the supplying of energy thereto in response to the temperature of said body member sensed by said temperature control means.

13. In an automotive fuel system for supplying fuel via a conduit means to a motor vehicle engine for combustion thereof, a fuel preheater adapted to be interposed in line with such a conduit comprising:

a body member;

said body member having defined therein a flow passage formed by a pair of generally parallel open-ended through bores serially connected adjacent one axial end thereof with the pair of adjacent open ends at said one axial end being closed by first plug means and the other pair of open ends thereof being adapted for connection in-line with such a conduit to permit a flow of fuel to be passed within said through bores;

elongated heating means extending generally coaxially within said flow passage;

heat exchange means circumferentially encompassing and extending axially of said heating means;

said heat exchange structure including an elongated generally helical coil means comprised of a plurality of axially adjacent coil turns formed about an axis coincident with the axis of said heating means, with at least some of said coil turns having plural support portions which project radially outwardly of said heating means and are spaced circumferentially about said heating means, and generally elongated contact portions connecting adjacent ones of said support portions and which are maintained in supporting and thermal conducting engagement with said heating means;

said support portions being maintained in engagement with peripheral wall portions of said flow passage to support said heating means with respect to said body member and to conduct thermal energy from said heating means to said body member;

said at least some of said coil turns defining a plurality of tortuous fluid flow paths extending generally axially of said heating means within said flow passage; and temperature control means carried adjacent an exterior surface portion of said body member and adjacent said peripheral wall portions, and operatively interacting with said heating means to control the supplying of energy thereto in response to the temperature of said body member sensed by said temperature control means.

* * * * *